(12) United States Patent
Gross

(10) Patent No.: US 11,999,463 B2
(45) Date of Patent: Jun. 4, 2024

(54) MOUNTING RAIL ARRANGEMENT FOR AN AIRCRAFT FLOOR, FLOOR STRUCTURE AND AIRCRAFT HAVING THE SAME

(71) Applicant: Airbus Operations GmbH, Hamburg (DE)

(72) Inventor: Claus-Peter Gross, Buxtehude (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 17/850,491

(22) Filed: Jun. 27, 2022

(65) Prior Publication Data

US 2023/0002062 A1 Jan. 5, 2023

(30) Foreign Application Priority Data

Jun. 30, 2021 (EP) .................. 21182985

(51) Int. Cl.
*B64C 1/20* (2006.01)
(52) U.S. Cl.
CPC ..................... *B64C 1/20* (2013.01)
(58) Field of Classification Search
CPC .................. B64C 1/20; B64C 1/18
See application file for complete search history.

(56) References Cited

U.S. PATENT DOCUMENTS

| 6,302,358 | B1 | 10/2001 | Emsters et al. |
| 8,979,450 | B2 | 3/2015 | Huber et al. |
| 2008/0098682 | A1 | 5/2008 | Wood |
| 2010/0108808 | A1 | 5/2010 | Allain et al. |
| 2014/0131519 | A1* | 5/2014 | Benthien ............ B64C 1/18 411/366.1 |
| 2018/0016009 | A1 | 1/2018 | Burd et al. |
| 2020/0094970 | A1 | 3/2020 | Galliot |
| 2021/0237878 | A1* | 8/2021 | Nichols ............ B64D 9/003 |

FOREIGN PATENT DOCUMENTS

| CN | 206 029 362 U | 3/2017 |
| CN | 109 110 134 A | 1/2019 |
| CN | 211 399 178 U | 9/2020 |
| DE | 102018123251 A1 | 3/2020 |
| EP | 2 848 533 A1 | 3/2015 |
| EP | 3 296 206 A1 | 3/2018 |
| EP | 3 315 408 A1 | 5/2018 |

OTHER PUBLICATIONS

European Search Report for U.S. Appl. No. 21/182,985 dated Dec. 9, 2021.

* cited by examiner

*Primary Examiner* — Brady W Frazier
*Assistant Examiner* — Shanna Danielle Glover
(74) *Attorney, Agent, or Firm* — KDW Firm PLLC

(57) ABSTRACT

A mounting rail arrangement for an aircraft floor, floor structure and aircraft having the same. To allow full floor structural decoupling for monuments and/or cabin attendant seats, a mounting rail arrangement includes two mounting rails having mounting holes distributed along their longitudinal direction. A mounting bolt is inserted into the mounting holes and an attachment bolt for fixing a cabin monument and/or a cabin attendant seat is inserted into the mounting bolt. As a result, the cabin monument and/or cabin attendant seat may be installed on at different locations and/or with different orientations using all kinds of configurations enabled by the mounting holes.

17 Claims, 6 Drawing Sheets

MOUNTING RAIL ARRANGEMENT FOR AN AIRCRAFT FLOOR, FLOOR STRUCTURE AND AIRCRAFT HAVING THE SAME

CROSS-REFERENCE TO RELATED APPLICATION

This application claims priority to EP Patent Application No. 21182985.8 filed Jun. 30, 2021, the entire disclosure of which is incorporated by reference herein.

TECHNICAL FIELD

The disclosure herein relates to a mounting rail arrangement for an aircraft floor. Furthermore, the disclosure herein relates to a floor structure for a fuselage of an aircraft and an aircraft having the floor structure.

BACKGROUND

US 2010/0108808 A1 discloses a system for fixing. A fixing element is inserted into an elongated hole and turned in order to fix the parts together.

EP 3315408 B1 discloses a seat rail adapter comprising two mounting parts. The mounting parts are anchored into a C-shaped channel by pivoting.

EP 3296206 A1 discloses a seat movement-securing device that includes a seat rail that may be fixed to an attachment member. A locking mechanism that is securely installed on the attachment member is used to secure the attachment member to the seat rail.

U.S. Pat. No. 6,302,358 B1 discloses a system to quickly convert part of the main deck of an aircraft from a passenger transport configuration to a freight transport configuration.

DE 102018123251 A1 discloses a rail system for fixing fittings in a cabin of a vehicle includes a first elongate rail body with a fixing side for fixing to a vehicle structure, an opposite support side with a support surface for receiving fittings, and a rail cross-section extending between the fixing side and the support side, and several fixing inserts which can be fixed along the support surface. The rail cross-section has two mutually opposing legs which are spaced apart from each other and run perpendicularly to the support surface, and the fixing inserts are configured so as not to protrude beyond the support surface.

SUMMARY

It is an object of the disclosure herein to allow full floor structural decoupling for monuments.

The object is achieved using the subject-matter disclosed herein. Preferred embodiments are disclosed herein.

The disclosure herein provides a mounting rail arrangement for an aircraft floor, the mounting rail arrangement comprising a first mounting rail having a first bottom leg, a first top leg, and a first mounting portion that is arranged between the first bottom and top legs; a second mounting rail having a second bottom leg, a second top leg, and a second mounting portion that is arranged between the second bottom and top legs, wherein the first and second mounting portions face each other and define a gap therebetween, wherein the first mounting portion includes a first mounting hole and the second mounting portion includes a second mounting hole, the mounting holes being aligned to receive a bolt member.

Preferably, the mounting rail arrangement further comprises a mounting bolt that is inserted in the first and second mounting holes.

Preferably, the mounting bolt includes a cross hole for receiving a bolt member. Preferably, the mounting bolt is arranged so that the cross hole is arranged within the gap so as to be accessible.

Preferably, the mounting rail arrangement further comprises an attachment bolt that is inserted in the cross hole and fixed to the mounting bolt so as to protrude above the top legs and prevent the mounting bolt from sliding out of the mounting holes.

Preferably, the first mounting rail and/or the second mounting rail is made of metal or metal alloy.

Preferably, the first mounting rail and/or the second mounting rail is made of a fiber composite material.

Preferably, the mounting rail arrangement further comprises a lower plate member attached to the bottom legs.

Preferably, the mounting rail arrangement further comprises an upper plate member attached to the top legs, the upper plate being configured for allowing protrusion of at least one bolt member.

Preferably, the mounting rail arrangement further comprises at least one floor panel that is attached to the top legs or the upper plate member.

The disclosure herein provides floor structure for a fuselage of an aircraft, the floor structure comprising a plurality of cross beams that are configured to horizontally extend in a direction orthogonal to a flight direction, and at least one preferred mounting rail arrangement, wherein the first mounting rail and the second mounting rail are aligned parallel to the flight direction.

Preferably, the floor structure further comprises a plurality of support beams that are attached to at least one of the cross beams, so as to allow support of the cross beams on the fuselage.

Preferably, at least two mounting rail arrangements are arranged in parallel and spaced apart from each other.

The disclosure herein provides fuselage for an aircraft, the fuselage comprising a preferred mounting rail arrangement and/or a preferred floor structure.

Preferably, the fuselage further comprises a monument and/or cabin attendant seats that is attached to the mounting rail arrangement and/or the floor structure.

The disclosure herein provides an aircraft having a preferred mounting rail arrangement and/or a preferred floor structure and/or a preferred fuselage.

The disclosure herein is about a full floor structural decoupling for monuments and/or cabin attendant seats. The cabin area of a single aisle aircraft needs to be rather variable in order to satisfy the customer requirements regarding installation and arrangement of monuments, such as galley, lavatory, etc.

Current designs are usually weight optimized for the respective Head of Version (hereafter: HoV). For each HoV the design is usually adapted. HoV complexity, however, has been increasing in recent years, which may delay or hinder continuous ramp-up of production.

The disclosure herein proposes a design that does not require structural changes, and allows all HoVs to be installed with a standardized floor structure. Ramp-up is secured by standardization in engineering and production.

The disclosure herein makes use of the existing hard point fixation principle and provides full flexibility in x-direction by replacing the usual I-beam profile with a double C-profile. The double C-profile provides the hole pattern for all variants. All concepts are at least weight neutral compared to the currently use configurations. This is true in particular, if the C-profiles are made from CFRP. Further opportunity for weight reduction is identified by adding a plate for better load introduction from profile to plate and then from plate to cross beams. The double shell concept with its two plates leads to a stiff box design. Selected CFRP material cost may be compensated by higher automatization, reduced part count and non-recurring cost (NRC) (customization), fast ramp up and rate flexibility.

BRIEF DESCRIPTION OF THE DRAWINGS

Embodiments of the disclosure herein are described in more detail making reference to the accompanying drawings.

DETAILED DESCRIPTION

Figure 1:
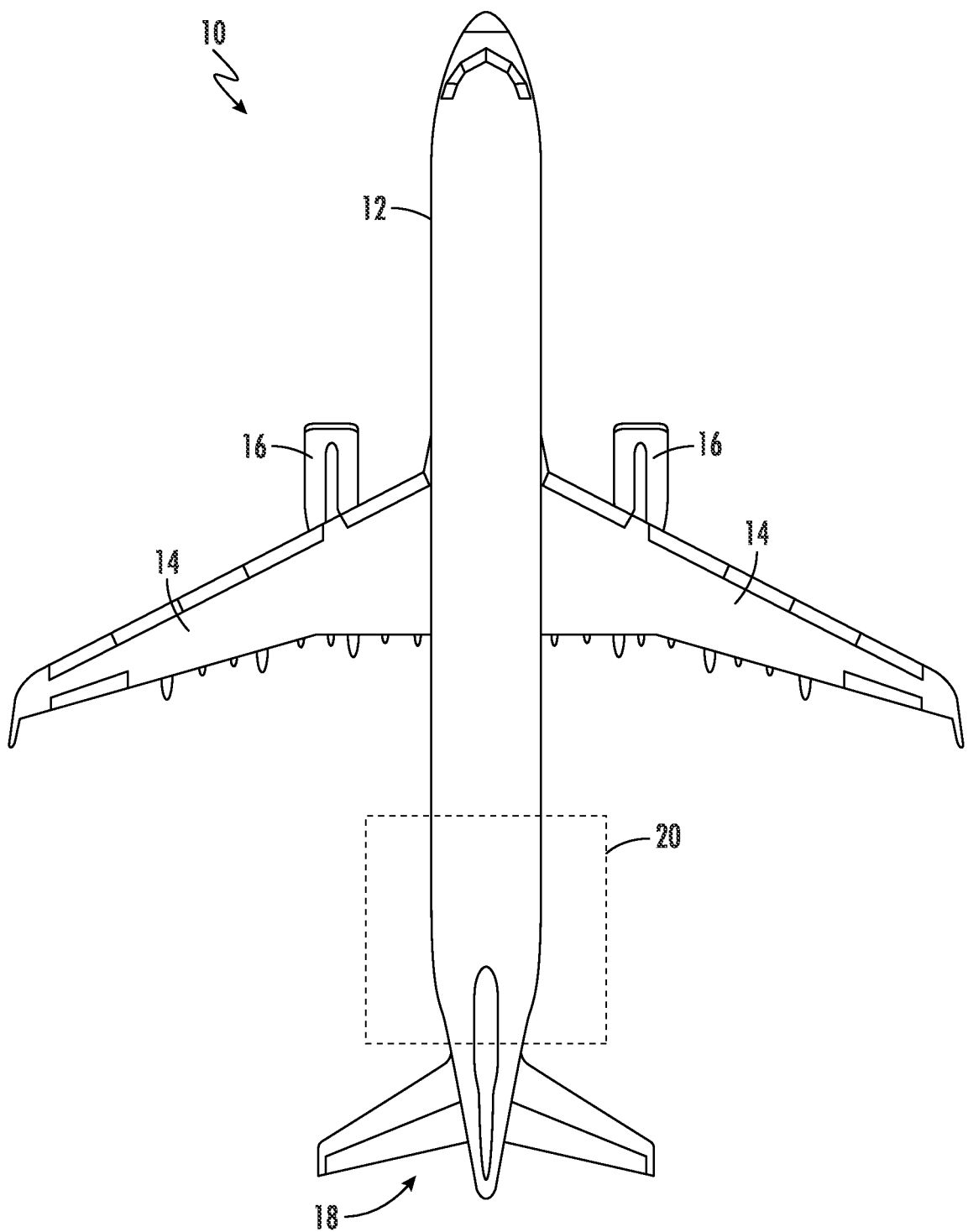
FIG. 1 depicts an embodiment of an aircraft.

FIG. 1 depicts an aircraft 10. The aircraft 10 comprises a fuselage 12 and a pair of wings 14 attached to the fuselage 12. The wings 14 comprise engines 16. The fuselage 12 further comprises a tail plane section 18 and an aft section 20 that is arranged near the tail plane section 18.

Figure 2:
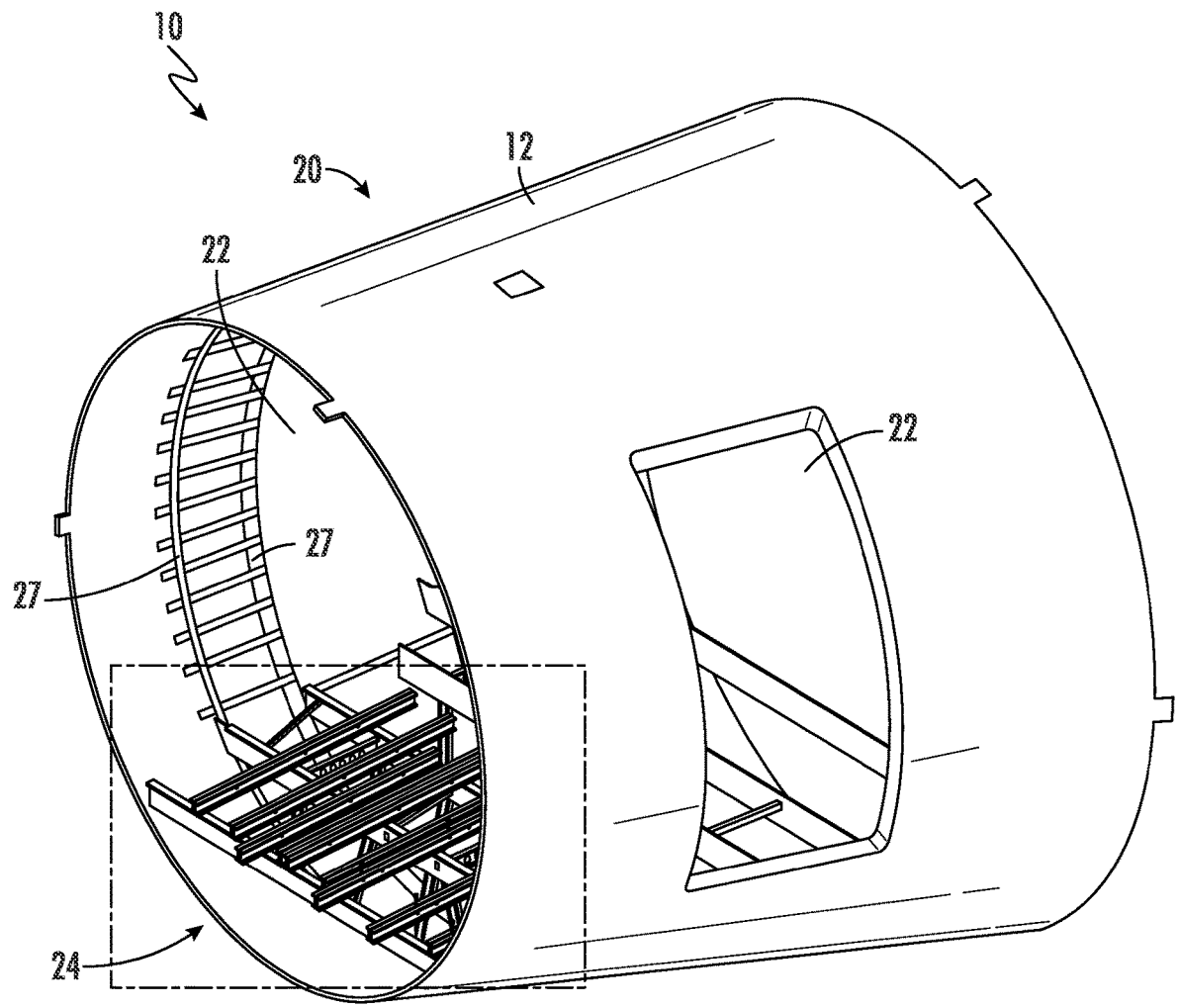
FIG. 2 depicts an embodiment of an aft section.

As depicted in FIG. 2, the aft section 20 includes a passenger door 22 and a floor structure 24 that is arranged within the aft section 20. The floor structure 24 is supported by the fuselage 12.

Figure 3:
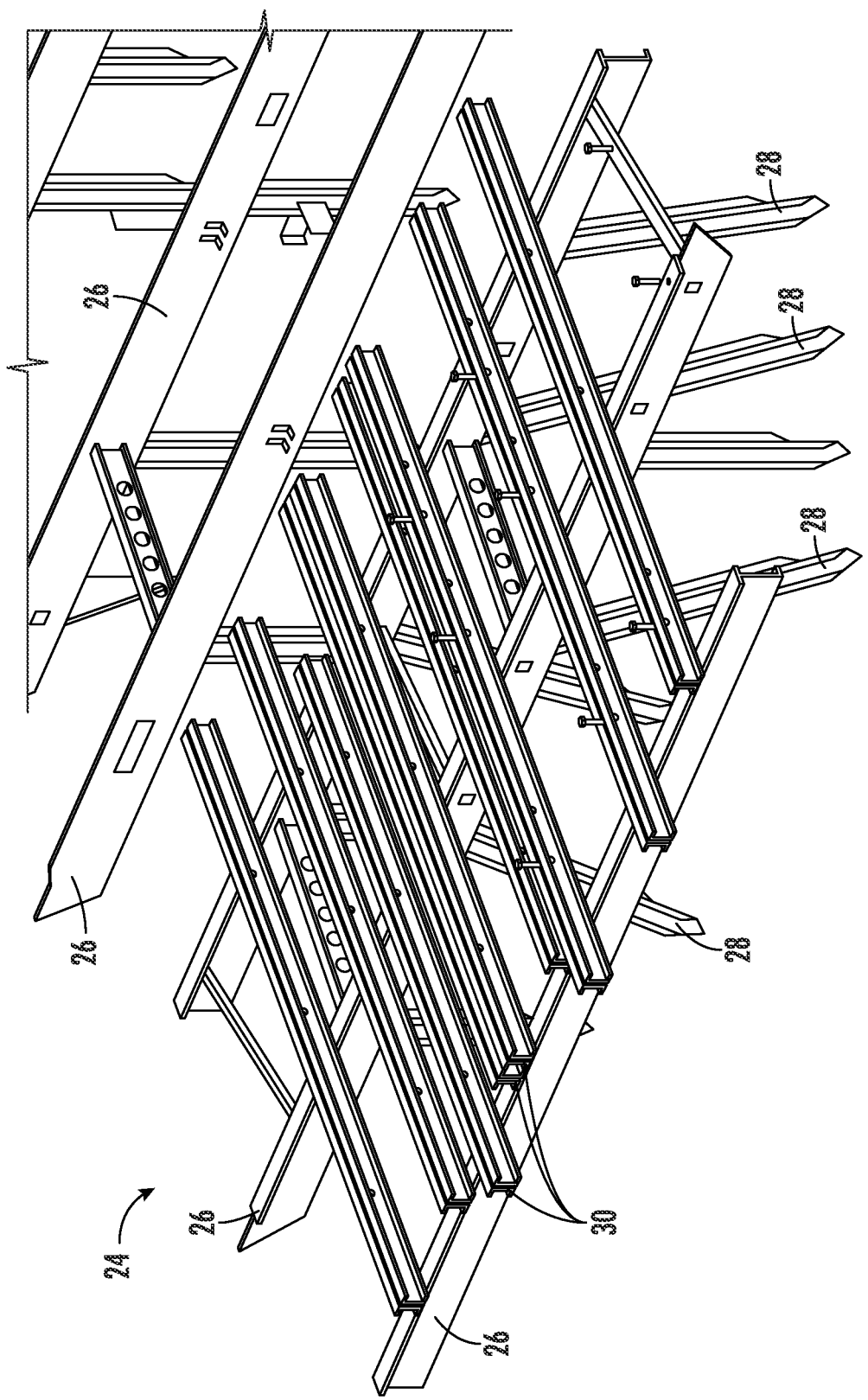
FIG. 3 depicts an embodiment of a floor structure.

Referring to FIG. 3, the floor structure 24 comprises a plurality of cross beams 26 that are laterally horizontally aligned. The cross beams 26 may be attached to a frame 27 (FIG. 2). The floor structure 24 also comprises a plurality of support beams 28 that are attached to the cross beams 26 and vertically support the cross beams 26. The support beams 28 are also preferably attached to the frame 27.

The floor structure 24 comprises a plurality of mounting rail arrangements 30. The mounting rail arrangements 30 may be supported by the cross beams 26. The mounting rails 30 are aligned parallel to the flight direction. The mounting rail arrangements 30 are spaced apart so as to form a mounting grid for cabin monuments and/or cabin attendant seats.

The floor structure 24 comprises a floor panel 32 that is directly supported or indirectly supported via another member.

Figure 4:
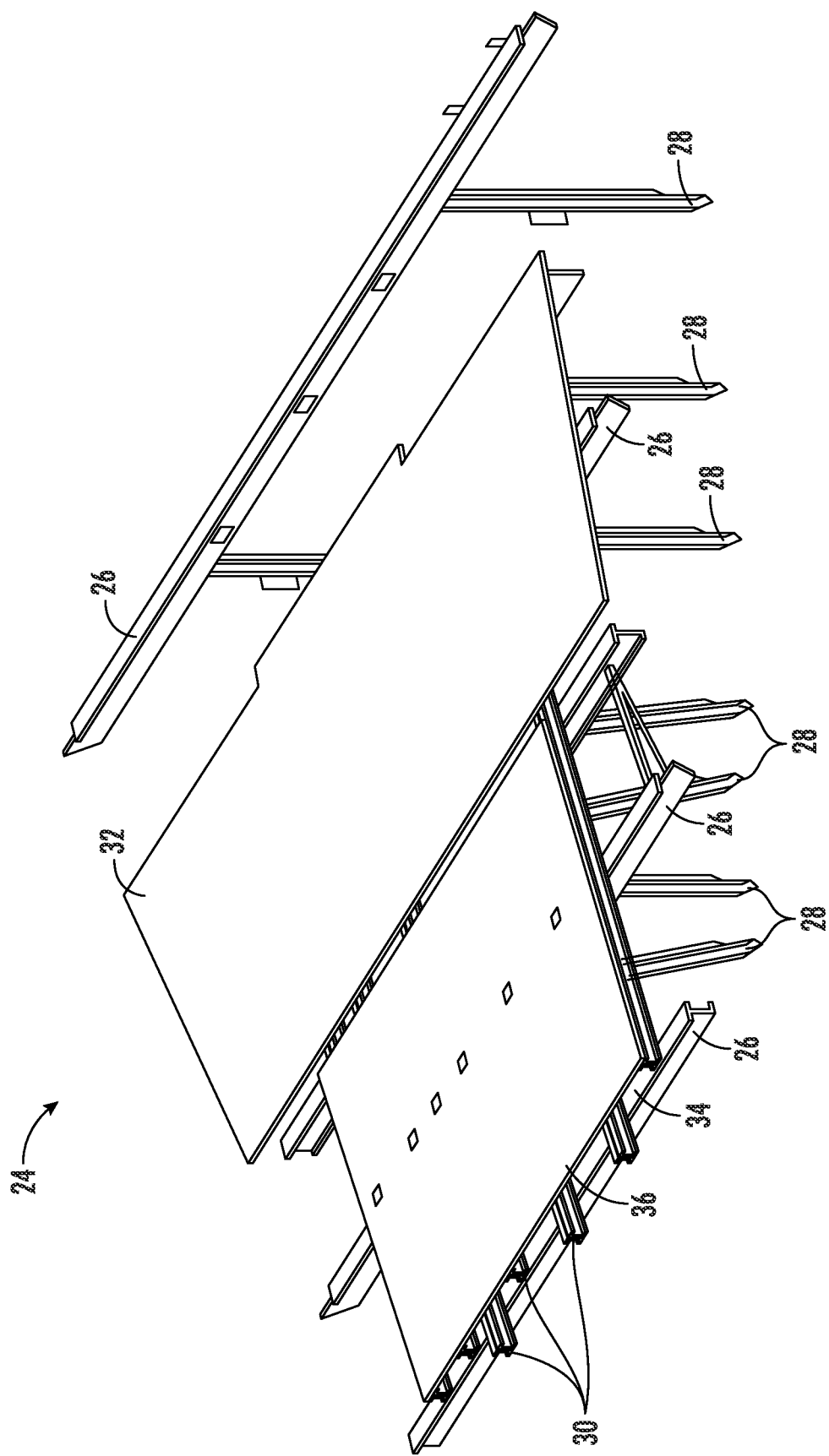
FIG. 4 depicts a variant of the floor structure of FIG. 3.

In a variant depicted in FIG. 4, the floor structure 24 may be configured as a box floor structure. In this case the floor structure 24 comprises a lower plate member 34 and/or an upper plate member 36. The lower plate member 34 is fixed to the mounting rail arrangements 30 an arranged between the mounting rail arrangements 30 and the cross beams 26. The upper plate member 36 is fixed to the mounting rail 30 and arranged between the mounting rail arrangements 30 and the floor panel 32.

Figure 5:
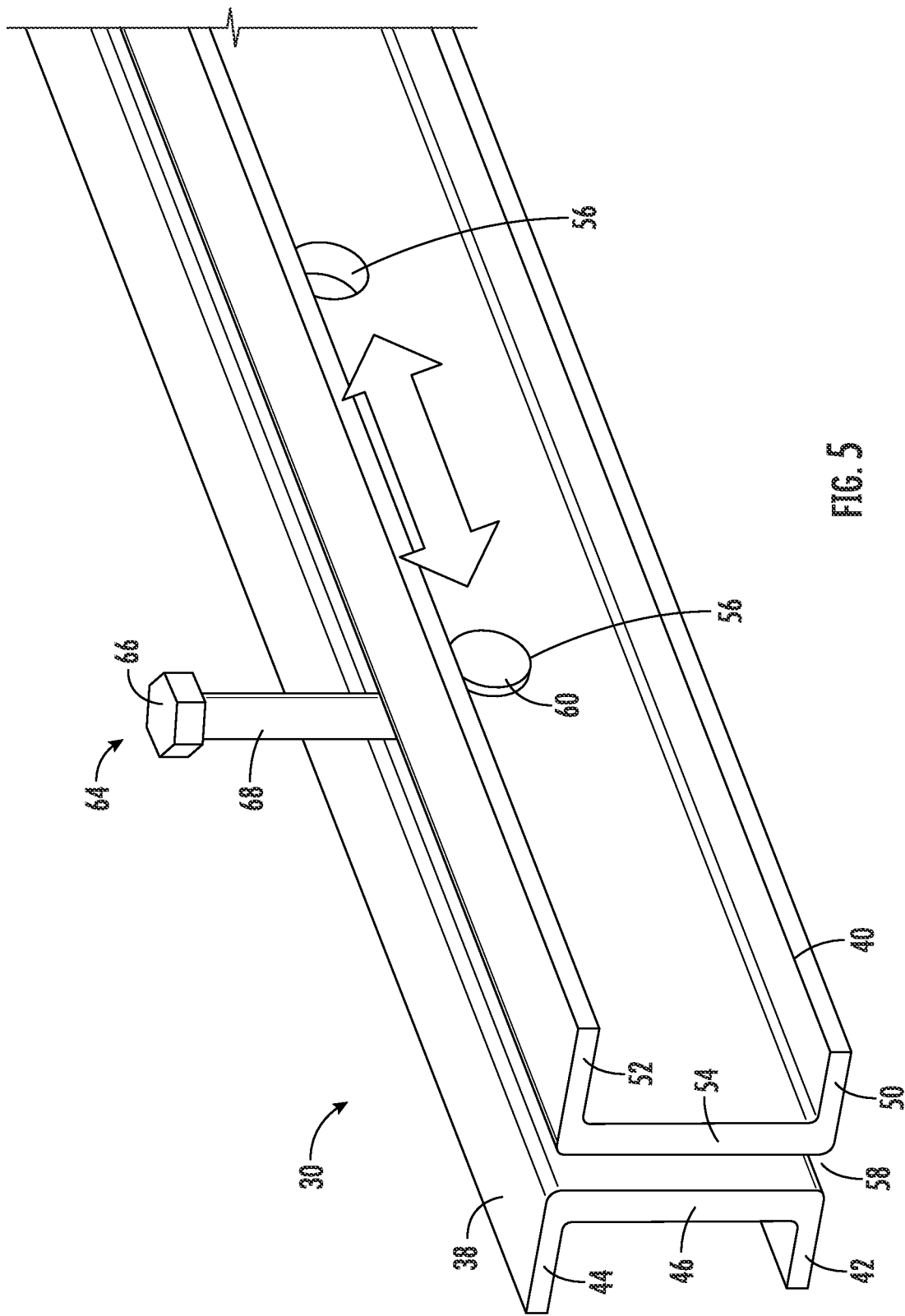
FIG. 5 depicts an embodiment of a mounting rail.
Figure 6:
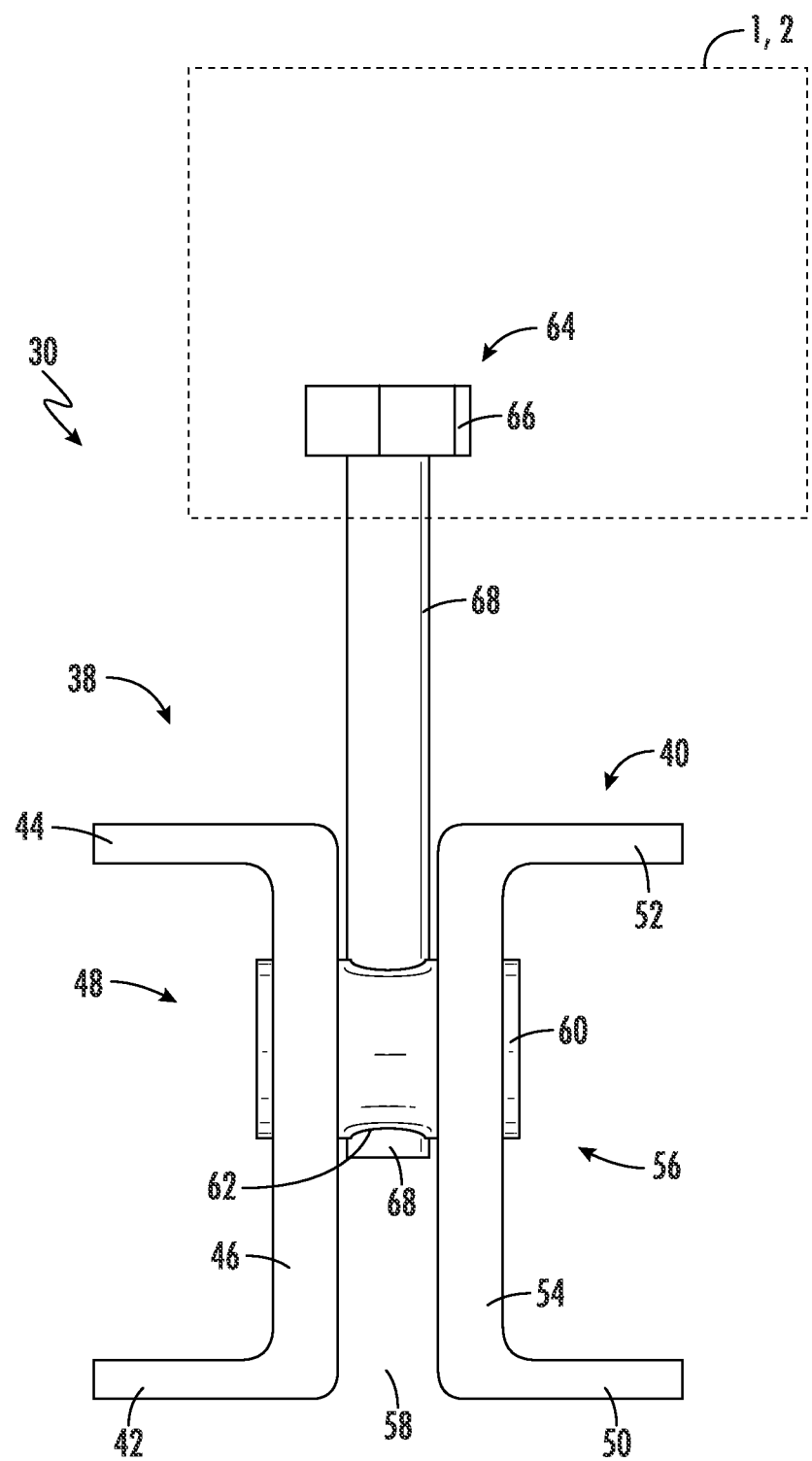
FIG. 6 depicts a head-on view of the mounting rail of FIG. 5.

Referring to FIG. 5 and FIG. 6, the mounting rail arrangement 30 comprises a first mounting rail 38 and a second mounting rail 40.

The first mounting rail 38 has a first bottom leg 42, a first top leg 44, and a first mounting portion 46. The first bottom leg 42 and the first top leg 44 are spaced apart from each other by the first mounting portion 46. The first mounting portion 46 includes a plurality of first mounting holes 48 that are distributed along the longitudinal direction of the first mounting rail 38.

The second mounting rail 40 has a second bottom leg 50, a second top leg 52, and a second mounting portion 54. The second bottom leg 50 and the second top leg 52 are spaced apart from each other by the second mounting portion 54. The second mounting portion 54 includes a plurality of second mounting holes 56 that are distributed along the longitudinal direction of the second mounting rail 40.

The first and second mounting rails 38, 40 are arranged such that the first and second mounting portions 46, 54 face each other. The first and second mounting rails 38, 40 define a gap 58 between them so that the first and second mounting portions 46, 54 are spaced apart from each other. The first and second mounting rails 38, 40 are arranged so that corresponding first and second mounting holes 48, 56 are aligned such that a bolt member may pass through them.

Furthermore, the first and second bottom and top legs 42, 44, 50, 52 are aligned so that they may evenly support the lower or upper plate member 34, 36 or the floor panel 32.

The mounting rail arrangement 30 comprises a mounting bolt 60 that may be inserted into a first and second mounting hole 48, 56. The mounting bolt 60 includes a cross hole 62. The cross hole 62 is preferably formed in the center of the mounting bolt 60 and configured as a through hole. The cross hole 62 preferably includes threads for a threaded bolt member.

The mounting rail arrangement 30 comprises an attachment bolt 64 that is configured for attachment of a cabin monument 1 and/or cabin attendant seats 2. The attachment bolt 64 may comprise a bolt head 66 and a bolt shaft 68 that is preferably threaded. The bolt head 66 may serve in installing the cabin monument 1 and/or the cabin attendant seat 2. The bolt shaft 68 is inserted, preferably threaded, into the cross hole 62. The attachment bolt 64 blocks movement of the mounting bolt 60 along its axis. The overall length of the attachment bolt 64 is chosen so that the attachment bolt 64 protrudes from the gap 58 and, if applicable, from the floor panel 32 and/or the upper plate member 36.

In order to allow full floor structural decoupling for cabin monuments 1 and/or cabin attendant seats 2, the disclosure herein proposes a mounting rail arrangement (30). The mounting rail arrangement (30) includes two mounting rails (38, 40) having a plurality of mounting holes (48, 56) distributed along their longitudinal direction. A mounting bolt (60) is inserted into the mounting holes (48, 56) and an attachment bolt (64) for fixing a cabin monument 1 and/or a cabin attendant seat 2 is inserted into the mounting bolt (60). As a result, the cabin monument 1 and/or cabin attendant seat 2 may be installed on or at different locations and/or with different orientations using all kinds of configurations enabled by the mounting holes (48, 56).

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 wing
16 engine
18 tail plane section
20 aft section
22 passenger door
24 floor structure
26 cross beam
27 frame
28 support beam
30 mounting rail arrangement
32 floor panel
34 lower plate member
36 upper plate member
38 first mounting rail
40 second mounting rail
42 first bottom leg
44 first top leg
46 first mounting portion
48 first mounting hole
50 second bottom leg
52 second top leg
54 second mounting portion
56 second mounting hole
58 gap
60 mounting bolt
62 cross hole
64 attachment bolt
66 bolt head
68 bolt shaft

The invention claimed is:

1. A mounting rail arrangement for an aircraft floor, the mounting rail arrangement comprising:
    a first mounting rail having a first bottom leg, a first top leg, and a first mounting portion, wherein the first mounting portion is arranged between the first bottom leg and the first top leg;
    a second mounting rail having a second bottom leg, a second top leg, and a second mounting portion, wherein the second mounting portion is arranged between the second bottom leg and the second top leg; and
    a mounting bolt comprising a cross hole for receiving an attachment bolt, wherein the attachment bolt is inserted in the cross hole and fixed to the mounting bolt to protrude above the top legs and prevent the mounting bolt from sliding out of the mounting holes;
    wherein the first and second mounting portions face each other and define a gap therebetween, the gap separating the first bottom leg from the second bottom leg and the first top leg from the second top leg;
    wherein the first mounting rail is separated from the second mounting rail by the gap;
    wherein the first mounting portion comprises a first mounting hole;
    wherein the second mounting portion comprises a second mounting hole; and
    wherein the first mounting hole is aligned with the second mounting hole and the mounting bolt extends through the first and second mounting holes.

2. The mounting rail arrangement according to claim 1, wherein:
    the mounting bolt is arranged so the cross hole is arranged within the gap to be accessible.

3. The mounting rail arrangement according to claim 1, wherein the first mounting rail and/or the second mounting rail is made of metal.

4. The mounting rail arrangement according to claim 1, wherein the first mounting rail and/or the second mounting rail is made of a fiber composite material.

5. The mounting rail arrangement according to claim 1, comprising a lower plate member attached to the bottom legs.

6. The mounting rail arrangement according to claim 1, comprising an upper plate member attached to the top legs, the upper plate member being configured for allowing protrusion of the attachment bolt.

7. The mounting rail arrangement according to claim 6, further comprising at least one floor panel attached to the top legs or the upper plate member.

8. A floor structure for a fuselage of an aircraft, the floor structure comprising a plurality of cross beams configured to horizontally extend in a direction orthogonal to a flight direction, and at least one mounting rail arrangement according to claim 1, wherein the first mounting rail and the second mounting rail are aligned parallel to the flight direction.

9. The floor structure according to claim 8, comprising a plurality of support beams attached to at least one cross beam of the plurality of cross beams to allow support of the at least one cross beam on the fuselage.

10. The floor structure according to claim 8, wherein at least two mounting rail arrangements are arranged in parallel and spaced apart from each other.

11. A fuselage for an aircraft, the fuselage comprising the mounting rail arrangement according to claim 1.

12. The fuselage according to claim 11, further comprising a cabin monument and/or cabin attendant seat attached to the mounting rail arrangement.

13. An aircraft comprising the mounting rail arrangement according to claim 1.

14. An aircraft comprising the floor structure according to claim 8.

15. An aircraft comprising the fuselage according to claim 11.

16. A fuselage for an aircraft, the fuselage comprising the floor structure according to claim 8.

17. The fuselage according to claim 16, further comprising a cabin monument and/or cabin attendant seat attached to the floor structure.

\* \* \* \* \*